J. HOENIGER.
Ore Amalgamator.
No. 35,876.
Patented July 15, 1862.
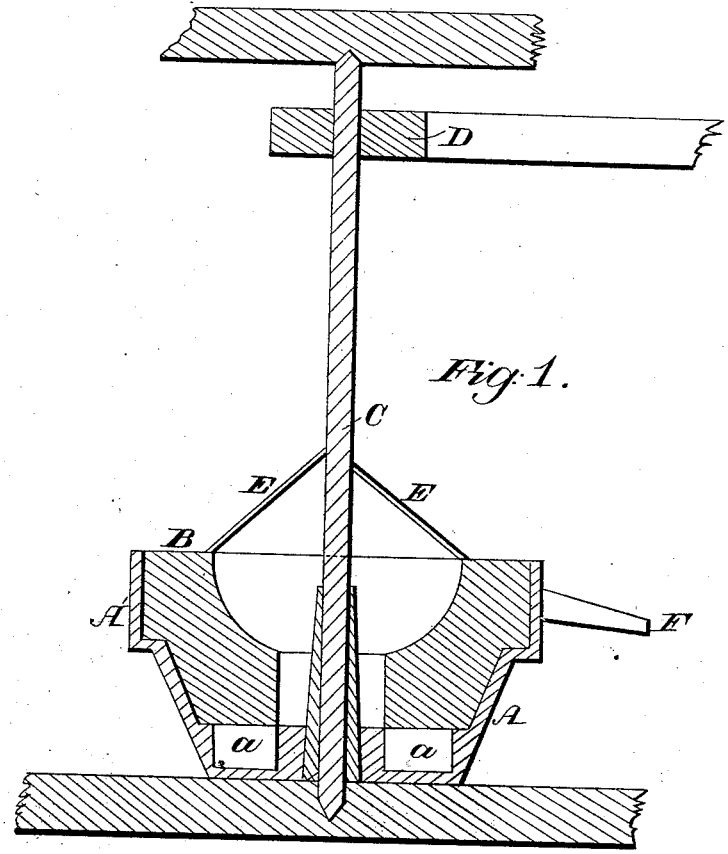
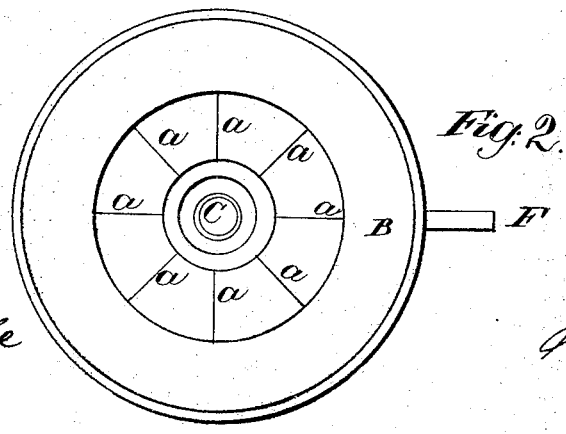

UNITED STATES PATENT OFFICE.

JOHN HOENIGER, OF NEW YORK, N. Y.

IMPROVED MACHINE FOR AMALGAMATING GOLD AND SILVER.

Specification forming part of Letters Patent No. 35,876, dated July 15, 1862.

*To all whom it may concern:*

Be it known that I, JOHN HOENIGER, of the city, county, and State of New York, have invented a new and useful Machine for Separating Gold or Silver from Gold or Silver Ores or from Gold or Silver Containing Sands; and I hereby declare the following to be a full, clear, and exact description thereof, reference being had to the annexed drawings, making part of this specification, in which—

Figure 1 is a vertical section of said machine; Fig. 2, a horizontal section thereof.

The same letters of reference mark the same parts in these figures.

The nature of my invention consists in constructing a machine consisting of a circular vessel with a disk fitting therein, through which a vertical axis or shaft is passed for the purpose of effecting the said separation of the gold or silver from the ores, as hereinafter described.

To enable others skilled in the art to make and use my invention, I will proceed to describe its construction and operation.

In the annexed drawings, A represents a vessel of round or circular form.

B represents a disk, hollowed in the center, fitting into said vessel. Through the center of the vessel and the disk a shaft, C, passes in such a manner as to turn the disk when the shaft is rotated, the said disk being attached to the said shaft by means of stays or rods E E, a belt-roller, D, or other similar means, being used to cause the turning of the shaft. The disk contains on its lower surface sharp metallic plates *a a a*, projecting from its lower surface.

Through the hollow of the disk the ores reduced to sand and mixed with water are inserted in a fluid state, and the vessel contains a pipe, F, by means of which the sand and water from which the gold or silver is extracted passes out of the vessel.

On the bottom of the vessel, and in the inside thereof, is placed a layer of mercury. The vessel itself is stationary, it being fixed to a base, through which the shaft passes.

This machine is used in the following manner: The pulverized ores mixed with water, being a fluid gold or silver containing mud, are made to flow into the hollow of the disk, and through the same reaches the bottom of the vessel. The disk is then turned until the whole of the gold or silver is attracted by the mercury in the vessel, the said mud being kept continually agitated, and will, after the gold or silver is extracted therefrom and left on the mercury, be raised to the height of the pipe F and will flow out by said pipe.

What I claim as new, and desire to secure by Letters Patent, is—

The herein-described machine for amalgamating and separating gold and other precious metals from their ores, consisting of the vessel A and the disk B, in combination with the projecting plates *a a*, all substantially as set forth and described.

JOHN HOENIGER.

Witnesses:
CHS. WEHLE,
JOHN P. MOSES.